United States Patent
Meyer et al.

(10) Patent No.: US 6,810,117 B1
(45) Date of Patent: Oct. 26, 2004

(54) METHOD AND CIRCUIT FOR SIMULTANEOUSLY ESTABLISHING COMMUNICATION LINKS BETWEEN A SUBSCRIBER STATION AND FURTHER SUBSCRIBER STATIONS

(75) Inventors: Gerald Meyer, Puchheim-BHF (DE); Helmut Schink, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/831,999

(22) PCT Filed: Nov. 9, 1999

(86) PCT No.: PCT/DE99/03573

§ 371 (c)(1),
(2), (4) Date: Aug. 20, 2001

(87) PCT Pub. No.: WO00/30400

PCT Pub. Date: May 25, 2000

(30) Foreign Application Priority Data

Nov. 16, 1998 (DE) .......................................... 198 52 789

(51) Int. Cl.⁷ .......................... H04M 7/00; H04M 11/00; H04J 3/04
(52) U.S. Cl. ...................... 379/219; 379/93.09; 370/535
(58) Field of Search ............................ 379/219, 220.01, 379/221.01, 229, 230, 90.01, 93.05, 93.07, 93.08, 93.09, 100.13, 100.15, 399.01, 413.02; 370/294, 352–355, 532, 533, 535, 542

(56) References Cited

U.S. PATENT DOCUMENTS

| | | | |
|---|---|---|---|
| 4,397,030 A | 8/1983 | Becker et al. | 375/257 |
| 4,658,397 A | 4/1987 | Kawamura et al. | 370/368 |
| 4,776,006 A | * 10/1988 | Comerford et al. | 379/159 |
| 4,807,225 A | * 2/1989 | Fitch | 370/295 |

FOREIGN PATENT DOCUMENTS

| | | |
|---|---|---|
| DE | 21 36 361 | 4/1972 |
| DE | 44 23 792 A1 | 1/1996 |
| DE | 197 30 986 A1 | 3/1998 |
| DE | 197 06 081 A1 | 8/1998 |

* cited by examiner

Primary Examiner—Benny Tieu
(74) Attorney, Agent, or Firm—Bell, Boyd & Lloyd

(57) ABSTRACT

A method and circuit for simultaneously establishing communication links between a subscriber station connected to a switching center of a communication network via a single subscriber line and other subscriber stations connected to the same communication network wherein, the relevant subscriber line is operated as a multi-channel multiplex line, between the switching center and a translating device which is preferably provided at the transition to another communication network, especially the Internet, a multi-channel multiplex junction line, on the one hand, and, on the other hand, a number of individual junction lines exist, in the translating device, a demultiplexer/multiplexer which is used for the respective transition from a multiplex link to individual connections and conversely is located between the multiplex junction line and the individual junction lines.

9 Claims, 1 Drawing Sheet

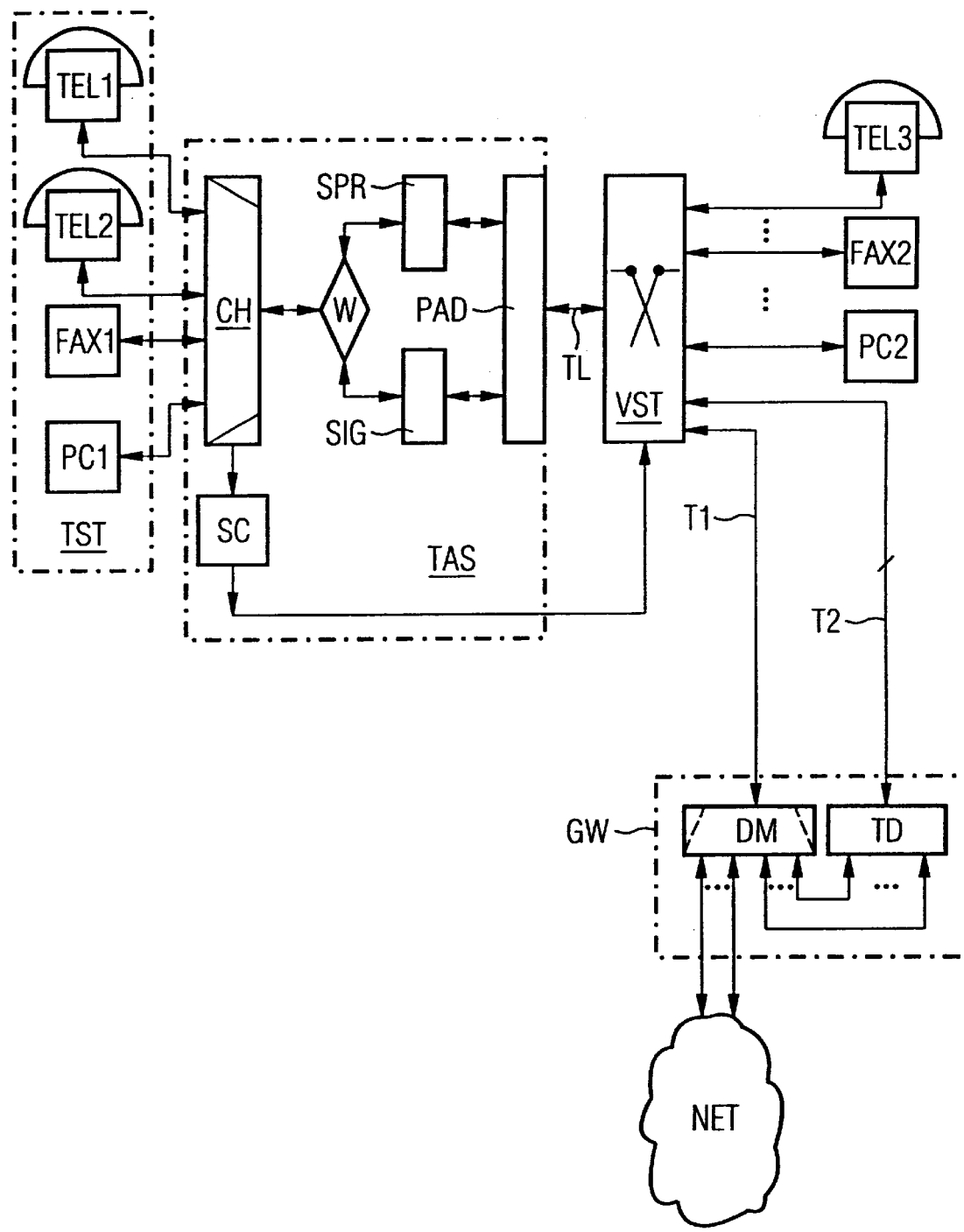

METHOD AND CIRCUIT FOR SIMULTANEOUSLY ESTABLISHING COMMUNICATION LINKS BETWEEN A SUBSCRIBER STATION AND FURTHER SUBSCRIBER STATIONS

BACKGROUND OF THE INVENTION

1. Field of the Invention

The present invention relates to a method and a circuit for simultaneously establishing a number of communication links between a subscriber station, which is connected to a switching center of a communication network via a single subscriber line, and other subscriber stations connected to the same communication network.

2. Description of the Prior Art

In currently existing communication networks, the communication accesses are only designed for producing a single connection in the case of analog accesses and, as a rule, for two communication links which can be established at the same time in the case of digital communication accesses, especially ISDN accesses. Although it is generally possible in ISDN communication networks to allocate a whole series of transmission channels to a subscriber station for simultaneously establishing a corresponding number of links, it must be taken into consideration that this procedure is not available everywhere and, in some cases, is not possible at all from the point of view of switching.

Accordingly, the present invention is directed to a way in which a number of simultaneous communication links are possible between a subscriber station connected to a switching center of a communication network via a single subscriber line and other subscriber stations connected to the same communication network.

According to the present invention, the object indicated above is achieved in a method wherein the subscriber line is operated, between its subscriber station and the associated switching center of the relevant one communication network, as a multiplex line via which a number of communication links to a corresponding number of communication terminals belonging to the subscriber station can be set up, in that at least one junction line is operated as a multiplex junction line between the relevant switching center and a translating device and in that, in the translating device, message signals for various communication links, transmitted in multiplex mode from the one subscriber station via the relevant one switching center, are conducted back in individual links to the switching center from which individual links are then set up to desired subscriber stations to be called, on the one hand, and, on the other hand, message signals intended for the communication terminals of the one subscriber station are accepted in individual links and are then conducted back to the individual communication terminals of the one subscriber station via the relevant switching center in a multiplex link.

The present invention has the advantage that, without any intervention in the switching system to which the one subscriber station is connected, a number of communication links can be simultaneously established between this subscriber station and a number of other subscriber stations connected to the same communication network. The method according to the present invention is, thus, especially well suited to a subsequent increase in the number of communication links which can be simultaneously established between a subscriber station connected to a switching center of a communication network via a single subscriber line and other subscriber stations connected to the same communication network.

The multiplex link is suitably operated as a time-division multiplex link. This has the advantage that the multiplex link can be achieved in a particularly simple manner.

It is of advantage if, when using a digitally operated subscriber line with at least one communication channel which can be used by the relevant subscriber station, this channel is divided into a number of subchannels in the time-division multiplex link.

It is of special advantage in this arrangement if the voice signals to be transmitted in the individual subchannels are transmitted in compressed form. This ensures that there is virtually no reduction in voice quality in the case of a transmission of voice signals.

When a translating device is used in a gateway to another communication network, especially a data network, preferably the Internet, message signals and signaling signals are suitably transmitted to and from the individual terminals of the one subscriber station in the form of data signal packets in the data network. In the case where the relevant data network is formed by the Internet, the transmission techniques practiced in the Internet are thus advantageously applied in said one subscriber station. In the case of voice connections, this is also called "Voice over IP (Internet Protocol)" world.

To carry out the method according to the present invention, it is appropriate to use a circuit having at least one subscriber station, which exhibits a number of communication terminals and which is connected to a switching center, especially a digital switching center of a communication network, via a single subscriber line.

According to the present invention, this circuit arrangement is characterized by the fact that the communication terminals provided at the at least one subscriber station are connected at the subscriber end of the subscriber line of the relevant subscriber station via a multiplexer/demultiplexer, that, at that switching center, a translating device having a demultiplexer/multiplexer is connected via at least one junction line, between which demultiplexer/multiplexer and former multiplexer/demultiplexer multiplex links can be set up from and to the communication terminals of the one subscriber station via the switching center and the subscriber line, and that the relevant translating device is also connected to the switching center via a number of individual junction lines via which, on the one hand, message signals supplied in a multiplex link via the junction line can be conducted back to the switching center in individual links, in which or via which switching center the relevant message signals can be forwarded to appropriate subscriber stations to be called and via which switching center, on the other hand, message signals can be conducted in the direction of communication terminals of the one subscriber station in individual links to the translating device, via the demultiplexer/ multiplexer of which these message signals can be transmitted in a multiplex link via the one junction line to the relevant one switching center and via the latter toward the appropriate communication terminals of the relevant subscriber station.

The circuit measures indicated above provide the advantage of a relatively low circuit expenditure overall when the method according to the present invention is carried out. In the switching center to which the one subscriber station is connected via its subscriber line, no circuit changes at all are carried out. Corresponding circuit measures are only taken at the relevant subscriber station and in the translating device.

The translating device is suitably contained in a gateway to another communication network, especially the Internet, in which arrangement communication links, which can be set up or forwarded to or from further subscriber stations connected at the further communication network, at the one switching center or at another switching center of the one communication network, can be set up between the relevant gateway and the subscriber station. This has the advantage that the circuit arrangement according to the present invention can be implemented in a particularly simple manner.

In the case where the further communication network is a data network, especially the Internet, a translating circuit is preferably provided between the multiplexer/demultiplexer and the subscriber line, in which circuit message signals and signaling signals delivered by the relevant subscriber station are translated into data signal packets which can be processed in the data network, and in which circuit data signal packets supplied from the data network are translated into message signals and signaling signals for delivery to the appropriate communication terminals of the subscriber station. This results in the advantage of relatively low circuit expenditure to be able to transmit the signals to be transmitted to and from the one subscriber station effectively in the data network. If the relevant data network is the Internet, the transmission protocols to be used for transmitting the various signals in the Internet can be easily taken into consideration in the aforementioned translating circuit.

It is also of advantage if the multiplexer/demultiplexer is connected to the switching system to which the one subscriber station is connected, via a separate signaling control circuit via which the respective connection setup from the relevant subscriber station via the switching system to the translating device connected thereto can be controlled. As a result, the respective connection setup from the subscriber station to the translating device can be controlled in a particularly simple manner.

Additional features and advantages of the present invention are described in, and will be apparent from, the Detailed Description of the Preferred Embodiments and the Drawings.

DESCRIPTION OF THE DRAWINGS

FIG. 1 shows an exemplary embodiment of a circuit in accordance with the teachings of the present invention.

DETAILED DESCRIPTION OF THE PREFERRED EMBODIMENTS

FIG. 1 shows a subscriber station TST which, in the present case, includes four communication terminals, namely a telephone terminal TEL1, another telephone terminal TEL2, a fax machine FAX1 and a home or personal computer PC1, and which is connected via a bidirectionally operated subscriber line circuit TAS and a subscriber line TL connected thereto to a switching center VST, to which the relevant subscriber station TST belongs, of a communication network. The relevant switching center VST is here connected via a gateway to another communication network which is here given by a data network NET which, in particular, can be formed by the Internet.

The aforementioned four communication terminals TEL1, TEL2, FAX1 and PC1 are connected to inputs/outputs of a channel-forming device or, respectively, a multiplexer/demultiplexer CH. The relevant multiplexer/demultiplexer CH is connected with its multiplex output/multiplex input end via a translating circuit—which will still be discussed in greater detail in the text which follows—contained in the subscriber line circuit TAS to the subscriber line TL via which the subscriber station TST is connected to the switching center VST to which the relevant subscriber station TST belongs.

In the present case, the aforementioned translating circuit includes—seen from the end of the subscriber station TST or, respectively, from the end of the multiplexer/demultiplexer CH—a bidirectionally operating combining/separating filter W in which the message signals and signaling signals delivered by the individual communication terminals are forwarded, on the one hand, separately to a message signal translator SPR, which also operates bidirectionally, and to a signaling translator SIG, which also operates bidirectionally. In these translators, the message signals and signaling signals delivered by the communication terminals are translated into data signals which meet the requirements of the regulations or transmission protocols which apply in the data network NET via which the relevant signals are to be conducted. It should also be noted at this point that analog voice signals supplied, for example, as message signals, are translated into digital data signals in the message signal translator SPR. In the signaling translator SIG, the signaling signals delivered by the communication terminals are translated, for example, in accordance with the regulations specified, for example, in ITU Recommendation H.323.

The translators SPR and SIG considered above are followed by an also bidirectionally operating packet assembly/disassembly device PAD toward the end of the subscriber line TL.

In this packet assembly/disassembly device PAD, the data signals supplied by the translators SPR and SIG are assembled to form data signal packets which are then delivered to the switching center VST via the subscriber line TL. The packet assembly/disassembly device PAD thus operates in packet assembly mode. On the other hand, the packet assembly/disassembly device PAD operates in packet disassembly mode in the reverse direction of transmission, that is to say for data signal packets supplied to it via the subscriber line TL, in order to forward the different data signals contained in data signal packets supplied to it to the two translators SPR and SIG in which message signals or signaling signals are again formed from these data signals, which can be delivered to the multiplexer/demultiplexer CH and via the latter to the respective communication terminals of the subscriber station TST via the combining/separating filter W.

The circuit shown in the drawing, via which the subscriber station TST is connected to its subscriber line TL, also includes a signaling control circuit SC which is connected at its input to the multiplexer/demultiplexer CH and which is supplied by the latter with connection setup information for setting up links via the switching center VST in question to the data network NET. At the output end, the relevant signaling control circuit SC is functionally connected to a control input of the switching center VST via which the respective link is thus set up toward the data network NET. It should also be noted here that, in the practical embodiment of the present invention, the connection setup information mentioned is naturally transmitted via the subscriber line TL as the only line by which the subscriber station TST is connected to the switching center VST.

The switching center VST of the one communication network is connected to the other communication network NET, already mentioned several times, which is, in particular, the Internet, via a junction line T1 and the gateway GW which, seen from the end of the switching center VST, acts as demultiplexer and seen from the end of the further communication network NET acts as multiplexer. The drawing shows such a demultiplexer/multiplexer DM in the relevant gateway GW. The relevant gateway, in this case, thus represents a translating device with this demultiplexer/multiplexer DM.

The gateway or translating device GW considered above is also connected to the switching center VST via a number of individual junction lines T2 which is illustrated by a single junction line crossed by a short diagonal line in the drawing. These individual junction lines T2 provided in a number are connected at the end of the gateway or translating device GW to a bidirectionally operable transmitting device TD which is connected at the input and output to the demultiplexer/multiplexer DM of the gateway or translating device GW.

In the drawing, a number of subscriber stations connected to the switching center VST are also indicated which, in each case, could have a communication terminal such as a telephone terminal TEL3, a fax terminal FAX2 or a personal computer or PC2, respectively.

Having previously explained the configuration of the circuit shown in the drawing to the extent required for understanding the present invention, the operation of this circuit and the method according to the present invention used in this operation will now be considered in greater detail.

If a communication link is to be set up from at least one of the communication terminals TEL1, TEL2, FAX1 and PC1 belonging to the subscriber station TST to another subscriber station which is connected to the same switching center VST to which the subscriber station TST is also connected, or which is connected to the same communication network to which the switching center VST belongs, a multiplex link with, in the present case, four multiplex channels is first set up in the subscriber line circuit TAS via the subscriber line TL and the switching center VST to the gateway or translating device GW of the further communication network NET. In this process, the transmission capacity available on the subscriber line TL can be allocated to the individual multiplex channels in accordance with the respective demand for transmission capacity or on the basis of fixed transmission capacity values. As such, in principle, arbitrary spacings are possible for the multiplex channels on the basis of the transmission capacities.

In the aforementioned multiplex link, only one multiplex channel is used if only one of the communication terminals mentioned wishes to set up a link. On the other hand, four multiplex channels are available in this example so that, in principle, all four communication terminals of the subscriber station TST can simultaneously set up links to desired subscriber stations.

The multiplex link mentioned extends, on the one hand, via the subscriber line TL to the switching center VST to which the relevant subscriber station TST belongs. The relevant multiplex link is forwarded from this switching center VST via the junction line T1 to the gateway or translating device GW in which, or, more accurately, in the demultiplexer/multiplexer DM of which the relevant multiplex link and the message signals transmitted in this multiplex mode are separated into individual links for various links which are then conducted back to the switching center VST via the transmitting device TD and the further individual junction lines T2. In the present case, the message signals transmitted in individual links are forwarded by this switching center VST to the desired subscriber stations to be called or to their communication terminals TEL3, FAX2 or, respectively, PC2. It should be noted at this point that the relevant subscriber stations do not need to be connected only to the same switching center VST to which the subscriber station TST is connected in order to receive message signals from the communication terminals of the subscriber station TST. Instead, the subscriber stations TEL3, FAX2, PC2 last considered can also be connected to any other switching center of the communication network to which the switching center VST belongs.

In the other direction, i.e. for communication links from the further subscriber stations or their communication terminals TEL3, FAX2, PC2, respectively, to the individual communication terminals TEL1, TEL2, FAX1, PC1 of the subscriber station TST, individual links are first set up from the relevant subscriber stations or their communication terminals TEL3, FAX2, PC2, respectively, via the switching center VST and the individual junction lines T2, toward the gateway or translating device GW. From the demultiplexer/multiplexer DM of the relevant gateway or translating device GW, these individual connections are then conducted as multiplex link by the junction line T1 back to the switching center VST from which this multiplex link is conducted via the subscriber line TL of the subscriber station TST. In these links, message signals first pass via the individual junction lines T2, toward the transmitting device TD of the gateway or translating device GW from which they are conducted in a multiplex link from the associated demultiplexer/multiplexer DM via the junction line T1 to the switching center VST and via the latter to the subscriber line TL. This multiplex link again includes, for example, four multiplex channels so that four communication links can be simultaneously set up to the four communication terminals TEL1, TEL2, FAX1, PC1 of the subscriber station TST in the communication network containing the switching center VST. If only one communication link is to be established, such a multiplex link is established, nevertheless, in which, however, only one multiplex channel is used for transmitting signals.

From the above explanation of the simultaneous establishment of a number of communication links between the communication terminals of the subscriber station TST and other subscriber stations which belong to the same communication network to which the subscriber station TST also belongs, it should be possible to see that only the demultiplexer/multiplexer function is used by the further communication network NET in its gateway or translating device GW; the relevant further communication network NET does not play any role here for establishing the connections considered.

In the previous text, the links between the subscriber station TST and the further communication network or data network NET have been called multiplex links in each case. The respective multiplex link can be preferably a time-division multiplex link in which signals are transmitted successively in time in individual time slots by time channels, the number of which is, for example, equal to the number of communication terminals of the subscriber station TST.

In the case of a digitally operated subscriber line TL having at least one communication channel which can be used by the subscriber station TST, the latter can be divided in the time-division multiplex link into a number of sub-channels in which voice signals to be transmitted can be transmitted in compressed form.

Although the present invention has been described with reference to specific embodiments, those of skill in the art will recognize that changes may be made thereto without departing from the spirit and scope of the invention as set forth in the hereafter appended claims.

What is claimed is:

1. A method for simultaneously establishing a plurality of communication links between a subscriber station, which is connected to a switching center of a communication network via a single subscriber line, and further subscriber stations connected to the communication network, the method comprising the steps of:

operating the subscriber line between the subscriber station and the switching center as a multiplex line;

setting up the plurality of communication links to a corresponding plurality of communication terminals belonging to the subscriber station via said multiplex line;

operating at least one junction line as a multiplex junction line between the switching center and a translating device;

conducting back, in the translating device, message signals for various communication links, transmitted in multiplex mode from the subscriber station via the switching center, in individual links to the switching center;

setting up individual links from the switching center to desired subscriber stations to be called;

accepting message signals, intended for the plurality of communication terminals of the subscriber station, in individual links; and conducting back the message signals to the plurality of communication terminals of the subscriber station via the switching center in a multiplex link.

2. A method for simultaneously establishing a plurality of communication links as claimed in claim 1, wherein the multiplex link is operated as a time-division multiplex link.

3. A method for simultaneously establishing a plurality of communication links as claimed in claim 2, wherein, when using a digitally operated subscriber line with at least one voice signal channel, the channel is divided into a plurality of subchannels in the time-division multiplex link.

4. A method for simultaneously establishing a plurality of communication links as claimed in claim 3, wherein the voice signals to be transmitted in the individual subchannels are transmitted in compressed form.

5. A method for simultaneously establishing a plurality of communication links as claimed in claim 1, wherein, when the translating device is used in a gateway to a further communication network, message signals and signaling signals are transmitted to and from the plurality of individual communication terminals in the form of data signal packets in the further communication network.

6. A circuit for simultaneously establishing a plurality of communication links between a subscriber station and further subscriber stations, comprising:

at least one subscriber station having a plurality of communication terminals;

a digital switching center of a communication network, the subscriber station being connected to the digital switching center via a single subscriber line;

a multiplexer/demultiplexer, wherein the communication terminals are connected at a subscriber end of the subscriber line of the subscriber station via the multiplexer/demultiplexer;

a translating device having a demultiplexer/multiplexer and being connected to the switching center via at least one junction line, wherein the demultiplexer/multiplexer and the multiplexer/demultiplexer multiplexer links are set up to and from the communication terminals of the subscriber station via the subscriber line; and a plurality of individual junction lines connecting the translating device to the switching center, and via which message signals supplied in a multiplex link via the junction line are conducted back to the switching center via which the message signals can be forwarded to appropriate subscriber stations to be called, and via which message signals intended for the communication terminals of the subscriber station can be accommodated in individual links, wherein the message signals are transmitted, via the demultiplexer/multiplexer, in a multiplex link via the junction line to the switching center and, via the switching center toward the communication terminals.

7. A circuit as claimed in claim 6, wherein the translating device is contained in a gateway to a further communication network, wherein communication links, which are set up and forwarded to and from further subscriber stations connected at the further communication network at at least one of the switching center and another switching center of the communication network, are set up between the gateway and the subscriber station.

8. A circuit as claimed in claim 7, further comprising:

a translating circuit, in the case where the further communication network is formed by a data network, provided between the multiplexer/demultiplexer and the subscriber line of the subscriber station, wherein circuit message signals and signaling signals delivered by the communication terminals are translated into data signal packets which are processed in the further communication network, and in which circuit data signal packets supplied from the further communication network are translated into message signals and signaling signals for delivery to the communication terminals of the subscriber station.

9. A circuit as claimed in claim 6, wherein the multiplexer/demultiplexer is connected to the switching system to which the subscriber station is connected, via a separate signaling control circuit by which the connection set up from the subscriber station via the switching system to the translating device connected thereto are controlled.

* * * * *